US012748397B2

(12) United States Patent

Gopalakrishnan et al.

(10) Patent No.: US 12,748,397 B2

(45) Date of Patent: Sep. 29, 2026

(54) USE OF A CURVE SECTION IN A PROCESS CONTROL SYSTEM

(71) Applicant: ABB Schweiz AG, Baden (CH)

(72) Inventors: Gayathri Gopalakrishnan, Solna (SE); Dawid Ziobro, Västerås (SE); Simon Linge, Västerås (SE); Divyasheel Sharma, Bangalore (IN); Chandrika K R, Bangalore (IN); Chriss Grimholt, Oslo (NO)

(73) Assignee: ABB SCHWEIZ AG, Baden (CH)

(*) Notice: Subject to any disclaimer, the term of this patent is extended or adjusted under 35 U.S.C. 154(b) by 409 days.

(21) Appl. No.: 18/555,575

(22) PCT Filed: Apr. 26, 2022

(86) PCT No.: PCT/EP2022/060965

§ 371 (c)(1),
(2) Date: Oct. 16, 2023

(87) PCT Pub. No.: WO2022/229132

PCT Pub. Date: Nov. 3, 2022

(65) Prior Publication Data

US 2024/0210905 A1 Jun. 27, 2024

(30) Foreign Application Priority Data

Apr. 26, 2021 (EP) .................................... 21170423

(51) Int. Cl.
*G05B 19/042* (2006.01)

(52) U.S. Cl.
CPC .. *G05B 19/042* (2013.01); *G05B 2219/23258* (2013.01)

(58) Field of Classification Search
CPC .......................................... G05B 19/042–0428
See application file for complete search history.

(56) References Cited

U.S. PATENT DOCUMENTS 9,823,627 B2 * 11/2017 Acosta Gonzalez . F04D 15/029
2003/0149493 A1 * 8/2003 Blevins ................ G05B 13/048 700/19

(Continued)

FOREIGN PATENT DOCUMENTS

CN 107221017 A 9/2017
CN 111932656 A 11/2020

(Continued)

OTHER PUBLICATIONS

European Search Report; Application No. 21170423.4; Completed: Sep. 23, 2021; Mailed: Oct. 4, 2021; 8 Pages.

(Continued)

*Primary Examiner* — Nicholas Klicos

(74) *Attorney, Agent, or Firm* — Greenberg Traurig, LLP

(57) ABSTRACT

A user terminal for a process control system obtains a first curve of a detected physical quantity of a piece of process control equipment in the process control system, where the first curve includes points with values of the physical quantity at various time instances, provides at least one of the points in a section of the first curve as a manipulable point that a user can change, receives from the user a change of at least one of the manipulable points in the section, thereby changing the section of the first curve, and applies the changed section of the first curve as an input to an operation in the process control system.

18 Claims, 7 Drawing Sheets

(56) References Cited

U.S. PATENT DOCUMENTS

| | | | | |
|---|---|---|---|---|
| 2004/0117766 | A1* | 6/2004 | Mehta | G05B 13/048 717/121 |
| 2004/0135534 | A1* | 7/2004 | Cullen | H02P 23/14 318/609 |
| 2013/0338797 | A1* | 12/2013 | Nagata | G05B 15/02 700/9 |
| 2016/0132037 | A1* | 5/2016 | Weng | G05B 19/056 700/87 |
| 2016/0231733 | A1* | 8/2016 | Nagatani | G05B 19/4097 |
| 2017/0322533 | A1* | 11/2017 | Romano | G05B 19/4099 |
| 2017/0364076 | A1* | 12/2017 | Keshmiri | B25J 9/1664 |
| 2018/0268050 | A1 | 9/2018 | Kotorov et al. | |
| 2019/0171775 | A1 | 6/2019 | Martin et al. | |
| 2020/0004741 | A1 | 1/2020 | Palou | |
| 2020/0012259 | A1* | 1/2020 | Uenishi | G05B 19/4093 |
| 2021/0382445 | A1* | 12/2021 | Harvey | G06Q 50/06 |

FOREIGN PATENT DOCUMENTS

| | | | |
|---|---|---|---|
| DE | 102009022227 | A1 | 9/2010 |
| DE | 112013007560 | T5 | 8/2016 |
| EP | 2677376 | A2 | 12/2013 |

OTHER PUBLICATIONS

International Preliminary Report on Patentability; Application No. PCT/EP2022/060965; Completed: Jul. 17, 2023; 7 Pages.

International Search Report and Written Opinion of the International Searching Authority; Application No. PCT/EP2022/060965; Completed: Aug. 5, 2022; Mailing Date: Aug. 16, 2022; 13 Pages.

Written Opinion of the International Preliminary Examining Authority; Application No. PCT/EP2022/060965; Mailed: Mar. 7, 2023; 5 Pages.

* cited by examiner

USE OF A CURVE SECTION IN A PROCESS CONTROL SYSTEM

TECHNICAL FIELD

The invention relates to the use of curves in a process control system. More particularly, the invention relates to a user terminal and process control system comprising such a user terminal as well as to a method, computer program and computer program product for using a curve in a process control system.

BACKGROUND

Operators and Engineers at process plants of process control systems rely heavily on curves in trend charts in their day to day work. The trends are often complex containing multiple parameters.

A key challenge arises when it comes to searching through trends. Users have stated the need to compare trends and search historical trends to assist in diagnosis, problem solving and optimizations. In their work, one of the main questions operators and engineers ask about a specific anomaly on a trend is "Has this happened before?

US 2019/0171775 discloses techniques for allowing a computer to search for graph shapes similar to a user-selected graph shape. A section of a chart can thereby be selected for comparing with other charts.

Curve based searching is also described in US 2020/004741.

However, a curve that is presently at hand may not be a good candidate for being used. The curve may not have the shape that a user is looking for. It may for instance have too high or too low minimum and/or maximum values and/or too steep or too gentle slopes. It may additionally be cumbersome for a user to locate the desired curve shape in the process control system.

Curves may also be of interest in other areas, such as when performing simulations.

There is thus a need for an improvement with regard to the use of curves in a process control system.

SUMMARY

One object of the invention is therefore to simplify the use of curves in a process control system.

This object is according to a first aspect achieved by a user terminal for a process control system, the user terminal comprising a processor configured to:

- obtain a first curve of a detected physical quantity of a piece of process control equipment in the process control system, where the first curve comprises points with values of the physical quantity at various time instances,
- provide at least one of the points in a section of the first curve as a manipulable point that a user can change,
- receive from the user a change of at least one of the manipulable points in the section, thereby changing the section of the first curve, and
- apply the changed section of the first curve as an input to an operation in the process control system.

The object is according to a second aspect achieved through a process control system comprising a user terminal according to the first aspect.

The object is according to a third aspect achieved through a method for using a curve in a process control system, where the method is performed in a user terminal and comprises:

- obtaining a first curve of a detected physical quantity of a piece of process control equipment in the process control system, where the first curve comprises points with values of the physical quantity at various time instances,
- providing at least one of the points in a section of the first curve as a manipulable point that a user can change,
- receiving from the user a change of at least one of the manipulable points in the section, thereby changing the section of the first curve, and
- applying the changed section of the first curve as an input to an operation in the process control system.

The object is according to a fourth aspect further achieved through a computer program for using a curve in a process control system, the computer program comprising computer program code which when run in a processor, causes a user terminal to:

- obtain a first curve of a detected physical quantity of a piece of process control equipment in the process control system, where the first curve comprises points with values of the physical quantity at various time instances,
- provide at least one of the points in a section of the first curve as a manipulable point that a user can change,
- receive from the user a change of at least one of the manipulable points in said section thereby changing the section of the first curve, and
- apply the changed section of the first curve as an input to an operation in the process control system.

The object is according to a fifth aspect further achieved through a computer program product for using a curve in a process control system, the computer program product comprising a data carrier with the computer program with computer program code according to the fourth aspect.

The invention according to the above-mentioned aspects has a number of advantages. Since a user may create his or her own shape, the location of a desired shape can be made faster than if the user would have to locate the shape in a database or in a curve. Moreover, since the desired shape can be formed from an existing shape, the effort required by the user to reach the desired shape can also be kept low.

A detected physical quantity of a piece of process control equipment in the process control system may be a physical quantity detected at the piece of process control equipment. A curve may in turn be a trend chart, such as a time-based trend chart of a physical quantity in the process control system. However, a curve is not limited to such trends but may be any type of graphical visualization of process related values in the process control system.

A manipulable point of a curve may be a physical quantity value at a certain point in time or at a certain time instance that the user is allowed to change. It is possible that a physical quantity value of the manipulable point is manipulable. It is also or instead possible that the time instance of the manipulable point is manipulable.

In one variation of the first aspect the processor is further configured to receive a new point in the section of the curve from the user and/or a user deletion of a manipulable point from the section of the curve.

In a corresponding variation of the second aspect, the method further comprises receiving a new point in the section of the curve from the user and/or a user deletion of a manipulable point from the section of the curve.

The manipulable points may define end points of curve segments and the received change of at least one manipulable point may lead to a change of at least one curve segment. The moving of a point may for instance lead to the curve segments it is used to define being changed, which may be a change of a slope of the curve segment in question. A deletion of a point may on the other hand lead to a removal of curve segments that the point is used to define or the replacement of these curve segments with a new curve segment.

In another variation of the first aspect, the processor is further configured to receive a selection from the user of the section of the first curve for enabling changing of the section of the first curve.

In a corresponding variation of the second aspect, the method further comprises receiving a selection from the user of the section of the first curve for enabling changing of the section of the first curve.

In a further variation of the first aspect, the processor is configured to receive the selection of the section of the first curve in a selection of two sections, each being a section of a corresponding curve, and when applying the section of the first curve is configured to apply the two curve sections of the two curves in the process control system.

In a corresponding variation of the second aspect, the selection of the section of the first curve is received in a selection of two sections, each being a section of a corresponding curve, and the applying comprises applying the two curve sections of the two curves in the process control system.

The application may comprise searching for the curve section in a database comprising values of the physical quantity. The search may comprise a search in a database with historic curves of physical quantities of the process control system. Alternatively or additionally, the search may comprise a search in a database of searches made by other users. The results may be provided according to different groups. A first group may then comprise a number of ranked results according to similarity to the historic curves, while a second group may comprise similarities to curve sections in searches made by other users.

The searching may comprise searching for the curve section in data of the same or a similar quantity of the same piece of equipment in the process control system. Alternatively, the searching may comprise searching for the changed curve section in data of the same or a similar quantity for another piece of equipment in the process control system, which other piece of equipment may be located upstream or downstream from the piece of equipment from which the changed curve section was obtained. It is additionally possible that the searching is based on identifying a similar shape to the shape of the changed curve section based on a distance function, such as using a z-normalization based Euclidean distance.

In a further variation of the first aspect, the processor may be configured to receive a selection of a weight of a curve segment of the curve section, and the searching for the curve section may involve a searching with the selected weight being applied for the curve segment.

In a corresponding variation of the third aspect, the method may further comprise receiving a selection of a weight of a curve segment of the curve section and the searching for the curve section may involve a searching with the selected weight being applied for said curve segment.

The processor may additionally perform a correlation of the user entered curve section to curve sections of other physical quantities and/or other pieces of equipment in the process control system, i.e. for physical quantities and/or pieces of equipment that are different from the same or similar quantities of the same or other pieces of equipment. The processor may then identify one or more curve sections of one or more of the other physical quantities and/or other pieces of equipment and suggest to the user to search among these other physical quantities and/or other pieces of equipment.

The method may then comprise performing a correlation of the user entered curve section to curve sections of other physical quantities and/or other pieces of equipment in the process control system, identifying one or more curve sections of one or more of the other physical quantities and/or other pieces of equipment and suggest to the user to search among these other physical quantities and/or other pieces of equipment.

According to another variation the application comprises applying the curve section as a curve section of the physical quantity in a simulation of the process. The changed curve section may for instance be used in the training of a model used in the process control system, such as in an event (anomaly) classifier.

The processor of the user terminal may be configured to implement a curve operations function comprising:

- a curve section selection module configured to obtain the first curve and optionally also to receive the selection of the section of the first curve from the user,
- a curve section editing module configured to provide at least one manipulable point in the section and receive a change of at least one of the manipulable points from the user, and
- a curve section application module configured to apply the changed section of the first curve in the process control system.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

The invention is generally directed towards a process control system and more particularly towards the use of curves for various operations in the process control system. A curve may be a time-based trend. However, it is not limited to such trends but may be any type of graphical visualization of process related values.

Figure 1:
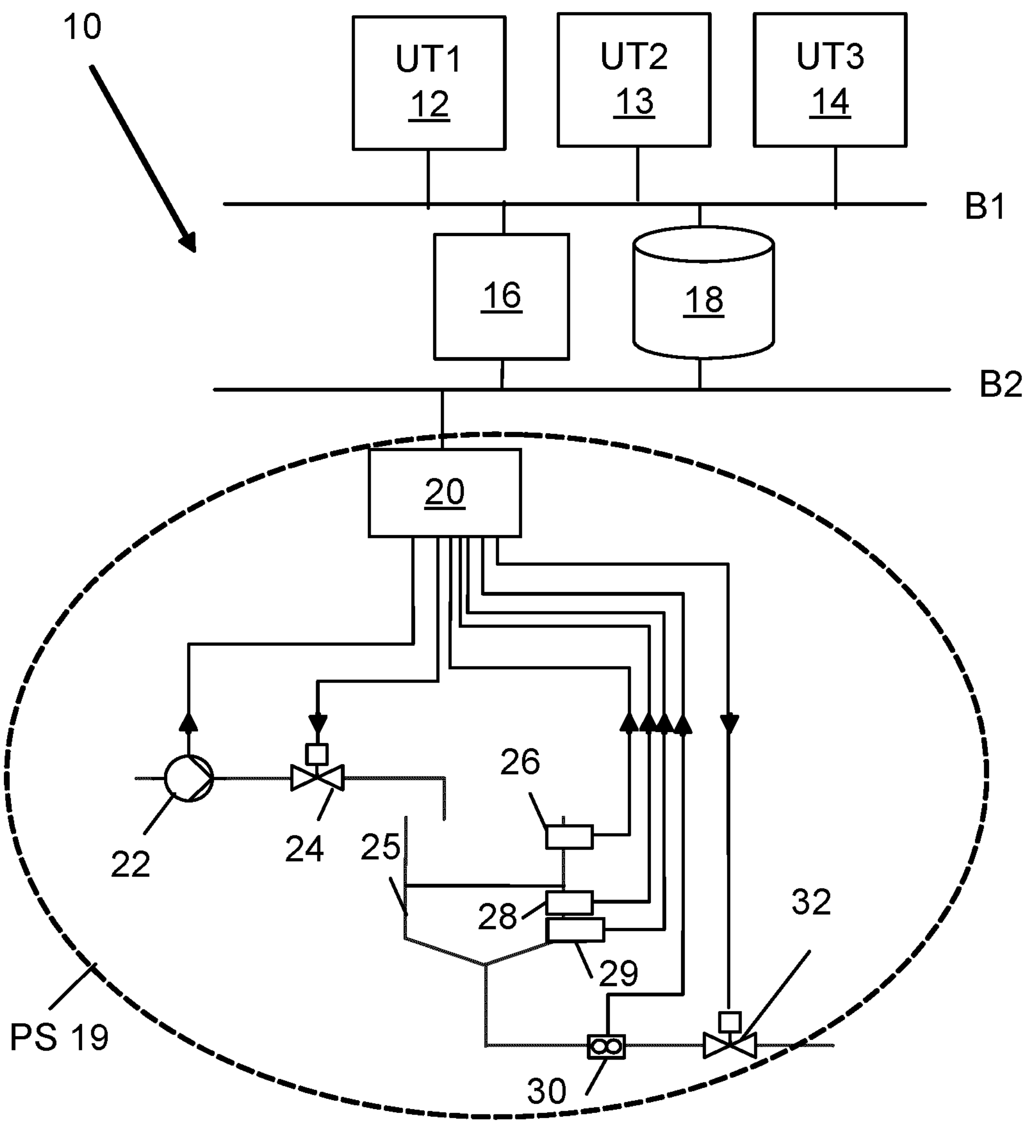
FIG. 1 schematically shows a process control system.

FIG. 1 schematically shows a process control system 10 for controlling an industrial process or perhaps part of an industrial process. Typical processes are electrical power generation, transmission, distribution and supply processes, water purification and distribution processes, oil and gas production and distribution processes, petrochemical, chemical, pharmaceutical and food processes, and pulp and paper production processes. These are just some examples of processes where the system can be applied. There exist countless other processes. Normally there may in such a system be one or more controllers having some local software for controlling one or more pieces of process control equipment. The process control equipment may comprise devices that influence or measure different properties of the technical process. A piece of process control equipment may for instance be a pump, a motor, a valve, etc. A process, or a part of a process, may be controlled via a server, which then typically communicates with a controller for providing local control. The process may be monitored through an operator terminal or workstation, which communicates with the server. Such a workstation or operator terminal is also a form of user terminal.

In FIG. 1 the system 10 therefore includes a number of user terminals UT1 12, UT2 13 and UT3 14 connected to a first bus B1. There is furthermore a second bus B2 and between the first and second busses B1 and B2 there are connected a server 16 with a control function for controlling the process and a database 18 with data concerning process control equipment, such as data concerning physical quantities of the process control equipment. To the second bus B2 there is furthermore connected a controller 20 (Process Controller or Programmable Logic Controller PLC) for providing local control in the system 10.

In the figure there is only provided one controller 20. It should however be realized that there may be several more controllers in the system 10. The controller 20 is then connected to one or more pieces of process control equipment. As an example, the controller 20 is shown as being connected to process control equipment in a process section PS 19 for controlling a part of the industrial process, which process section 19 includes a first inlet pipe leading to a tank 25 and a second outlet pipe leaving the tank 25. In the first pipe there is provided a pump 22 that pumps fluid into the first pipe as well as a first valve 24. In the tank 25 there are provided two level sensors 26 and 28 and in the outlet pipe there is provided a flow meter 30 and a second valve 32. There is also a temperature sensor 29 in the tank 25. The pipes, tank, valves and sensors are examples of process control equipment. The level sensors 26 and 28 measure the physical quantity liquid volume, the temperature sensor measures the physical quantity liquid temperature and the flow meter 30 measures the physical quantity volumetric flow rate of the liquid. The controller 20 may receive control input values from the pump 22, level sensors 26 and 28 and temperature sensor 29 and regulate the liquid level in the tank 25 based on these control input values through controlling the first valve 24. It also receives control input values from the flow meter 30 and temperature sensor 29 and controls the second valve 32 for regulating the output fluid flow. The above-described control is merely an example of one type of control in a process control example. It should be realized that several different other types of control are possible and that several other types of physical quantities can be measured. It is for instance possible to also measure pressure. The above-described process control equipment are therefore also merely examples of process control equipment that can be used.

Figure 2:
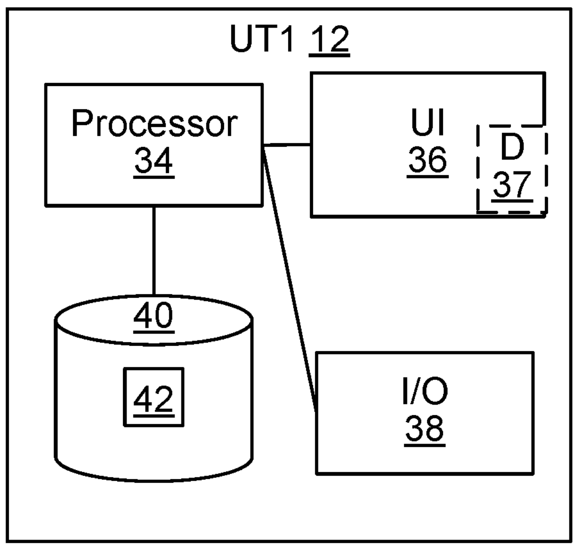
FIG. 2 shows a block schematic of a user terminal in the process control system, FIG. 3 schematically shows a number of modules used to implement a curve operations function of the user terminal.

FIG. 2 schematically shows one realization of a first user terminal UT1 12. There is a processor 34 and a data storage 40 with computer program instructions 42 that, when executed by the processor 34, implements a curve operations function or curve operations program. There is also an input/output (I/O) interface 38 for communication with the other entities in the process control system and more particularly for communicating with the server 16 and/or the database 18. Finally, there is a user interface UI 36 which comprises a display D 37 for displaying information about the process and the process control system to a user, such as an operator. The display 37 may be a touch screen display allowing the user to input data and commands. It should be realized that the user interface 36 may also or instead comprise other means of allowing user input, such as a mouse or trackball, a keyboard or a keypad.

Figure 3:
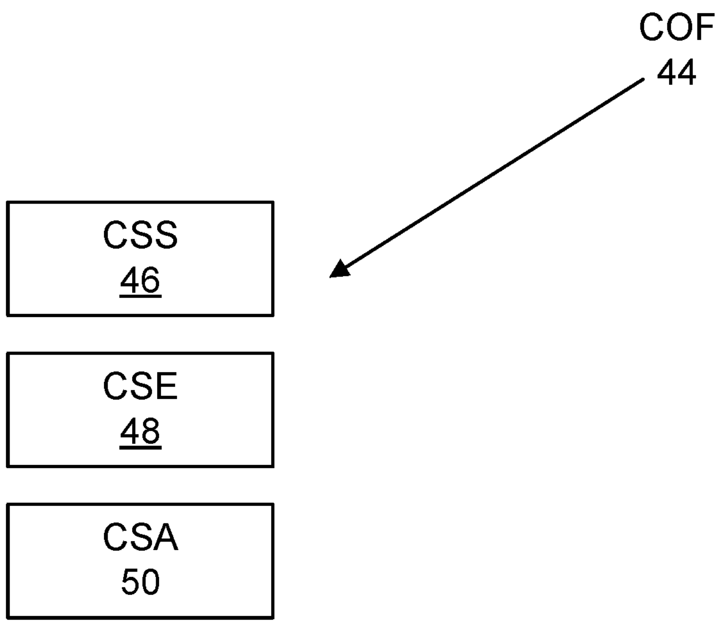

FIG. 3 schematically shows a number of modules used to implement the curve operations function COF 44. There is a curve section selection module CSS 46, a curve section editing module CSE 48, a curve section application module CSA 50, which modules are implemented through the processor 34 and computer program instructions 42.

In process control systems the users are often interested in looking at curves of detected or measured physical quantities associated with the process control equipment, i.e. of physical quantities that have been detected at the process control equipment, where the curves may be curves of currently detected quantities or historic curves. For a user a section of a curve can be of interest for a variety of reasons. It may be of interest to find the same or similar shapes in other places, such as in other sections of the same curve or in curves of the same or related quantity in the same or other process control equipment.

Moreover, such curves are often complex containing multiple parameters.

A key challenge arises when it comes to searching through curves. Users have stated the need to compare trends and search historical trends to assist in diagnosis, problem solving and optimizations. In their work, one of the main questions users ask about a specific anomaly on a trend is "Has this happened before?". While some tools offer some features to answer the question, the interaction is normally limited and in some cases involves multiple steps making it time consuming.

The use of curve sections may thus be of interest when performing searches. However, they can also be of interest in other applications, such as in simulation.

If for instance looking at the process control equipment of the tank 25 in FIG. 1, a user may want to look at a curve depicting the temperature of a liquid in it at various points or instances in time as well as the temperature of the same or another liquid in another tank in the system such as for instance in another tank located upstream or downstream from the tank 25.

It may therefore be of interest to use a curve shape as input for a number of operations, such as searching in the database 18 or performing simulations. A curve of a measured or detected physical quantity such as volume, pressure and/or temperature can then be used. It may for instance be of interest to see if a curve shape being displayed can be found in other places, such as in other parts of the curve displaying the physical quantity of the process control equipment or in similar curves of other process control equipment in the same or a different plant.

However, a curve that is presently at hand may not have the characteristics that the user needs. It may for instance have a too high or too low minimum and/or maximum value and or too high or too low a slope. It may additionally be difficult, time-consuming and cumbersome for the user to locate such a desired curve shape in the process control system. The locating of the desired curve shape that is to be used as input may involve extensive searching in databases for the same or other pieces of equipment.

Aspects of the present disclosure are directed towards improving on this situation.

Figure 4:
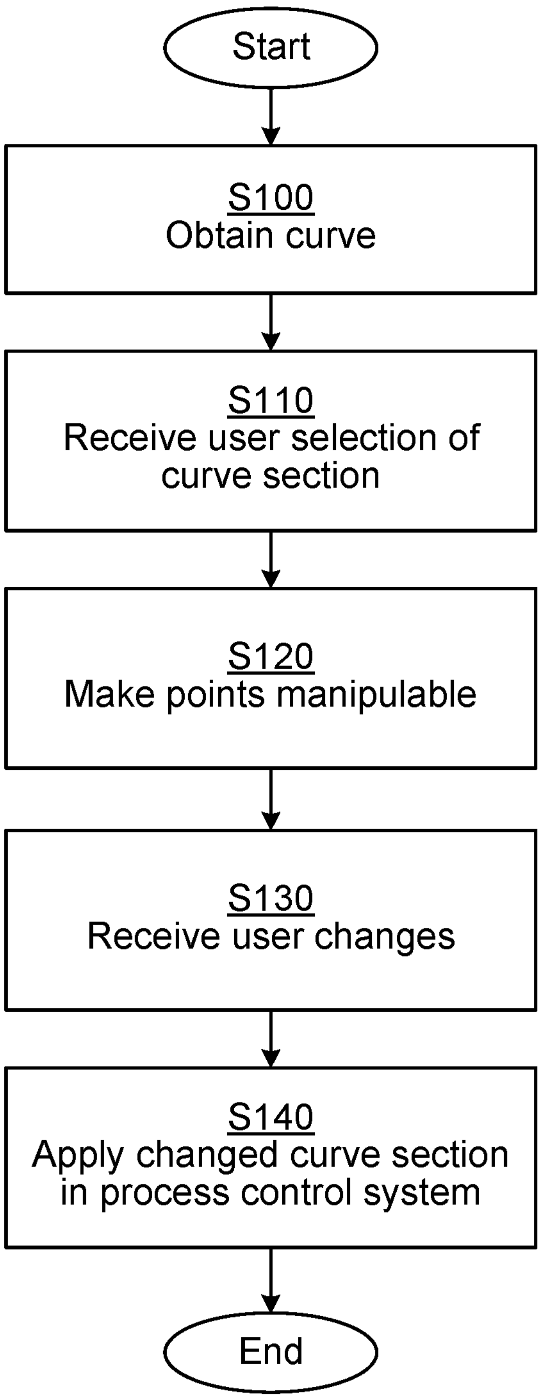
FIG. 4 shows a flow chart in a method of using a curve in a process control system and being performed via the user terminal.
Figure 5:
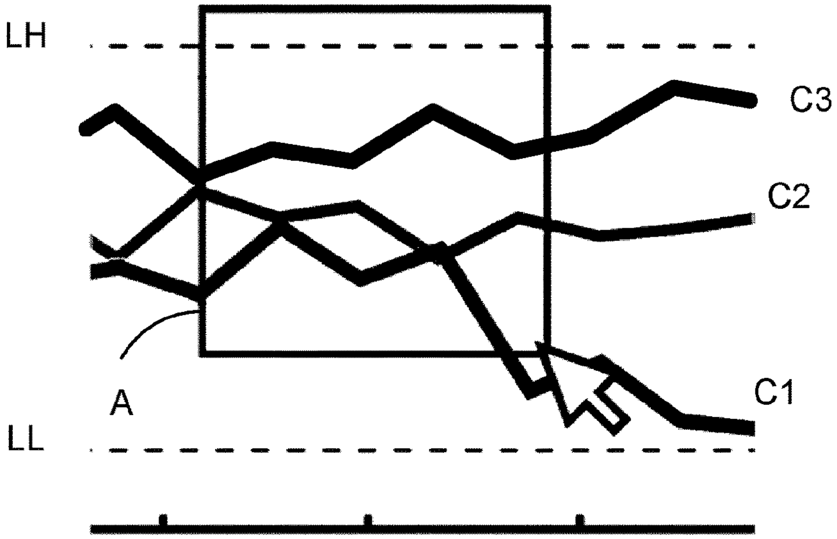
FIG. 5 shows a selection of an area of a display from which input to an operation is being made, which area comprises curve sections of a first, second and third curve.
Figure 6:
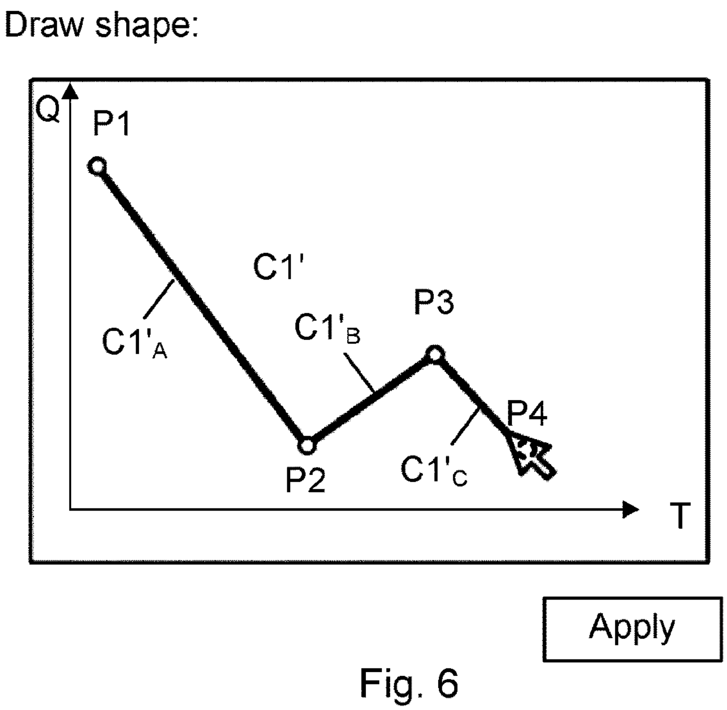
FIG. 6 shows the curve section of the first curve comprising a first, second and third curve segment and a first, second, third and fourth manipulable point, which first curve section has been varied by the user

These will now be described with reference being made to FIGS. 4, 5 and 6, where FIG. 4 shows a flow chart of a number of method steps in a method of using a curve in a process control system, FIG. 5 shows three sections of three different curves having been obtained in a snipping action and FIG. 6 shows a change of a first of the curve sections in order to obtain a curve section to be used in an operation, such as searching or simulating.

The curve operations function may be activated using an appropriate icon. The mode of activation may be a click (mouse based), tap (touch based) or similar depending on the user terminal.

After activation, the curve section selection module 44 of the curve obtaining function 46 may obtain a curve of a detected physical quantity Q of a piece of process control equipment in the process control system 10, S100, where the curve comprises points with values of the physical quantity at various points in time, i.e. at various time instances. The obtaining can be achieved in a number of ways.

A curve may be a historic curve of a detected physical quantity from the database 18 that is being displayed on the display 37. As an alternative a curve may be the curve of a currently detected physical quantity, the quantity may thus be the "live" or on-line quantity being displayed on the display 37. If the quantity is a historic quantity, the user may move along a time axis of the curve in order to show the curve at different historic points in time. In the case of a "live" or "on-line" current quantity, the user may select to freeze the display so that parts of the curve at around a freeze point in time can be used as input to the operation.

The user may then select a part of a curve or a curve section, for instance through snipping a part of a curve currently being displayed, which part being currently displayed may thus be a selected historic time interval or an interval around the freeze point in time. It is also possible to highlight a curve that the user would like to use.

The selection may be carried out based on snipping. The user can snip any curve that contains a parameter or physical quantity of interest. When activated the curve section selection module 46 may provide a marker in the form of an arrow. The user can click and drag the marker to form a polygon such as a square around a desired operation input area A. The polygon can be resized as necessary. The operation input area A may be visually distinct from the rest of the screen to help the user notice his or her selected area. In the example of FIG. 5, the user has placed the area A around three sections of the three curves C1, C2 and C3. Any curve section in the area A can then be selected by the operator as a curve section to be used in the ensuing operation, such as being used in a curve-based search.

When the snip option is chosen, the curve section selection module 44 may highlight parts of the view that can serve as an input. This depends on the fidelity of the system. In the most basic implementation, curves that can serve as input to the operation will be visually highlighted.

While the key aspect is to select curve sections, the snip option can also be used to select other elements including but not limited to process values, equipment or tables. All forms of visual highlighting is possible, including but not restricted to colour, shape, shadow or transparency.

This resolves any possible ambiguity the user may have about which parts of the interface he or she could use as an input to a desired operation.

The curve section selection module 46 may thus receive a selection from the user of a section of a curve for performing said operation, S110. As was mentioned earlier, the user can select one of the curve sections, for instance through snipping the section that he or she would like to use in the desired operation. It is also possible to place the arrow on a curve section in order to select it. In the present example the user selects the section of the first curve C1 that is enclosed in the area A, which selection is received by the curve section selection module 46.

Since trends in process control industries may be densely populated, there may be a need for selection refinement. In cases where several parameters are plotted on the same graph, it might be challenging for the user to snip the exact region. Selection refinement aims to resolve this challenge.

Selection refinement offers modifications to and around the snipped area A. The curve section selection module 46 interprets the snip and offers the way to modify the curve section that is to be used using text, sliders, check boxes or similar means. The refinement can also be done by resizing the snip boundaries. Thereby the user can fine tune the input by selecting or removing one or more curve and determining time ranges.

Here it should be realized that it is also possible to also add other aids for the selection such as maximum and minimum value levels LH and LL within which the physical quantities of the curves are allowed to vary.

In this way a user may thus select a curve section of a curve depicting the time dependency of a physical quantity of a piece of process control equipment for use as an input to an operation in the process control system, where as an example a section of the first curve C1 of the temperature in the tank 25 is selected.

However, as was mentioned earlier, the selected curve section may not resemble a desired curve section as much as the user desires. The user may thus want to change the curve section before it is being put to use in the operation in the process control system 10.

It might happen that the shape of the curve that the user wants to use, is not in the view available to the user. Instead of navigating to a point in time where such a curve shape exists, the user is allowed to edit the base curve to a hypothetical shape and use it in the desired operation.

For this reason, the curve section editing module 48 makes or provides at least one point and possibly all points in the section of the first curve C1 as manipulable points, S120, so that the user can change or edit the base curve to a hypothetical shape and use it in the operation. A manipulable point of a curve may thus be a physical quantity value at a certain point in time or at a certain time instance that the user is allowed to change. In FIG. 6 three such manipulable points P1, P2 and P3 have been visualized for the first curve that displays the quantity Q in dependence of time T. There is also a fourth such point P4, which point P4 is hidden beneath an arrow used by the user. Furthermore, there are also three different exemplifying curve segments. There is a first curve segment $C1'_A$ between the first and the second points P1 and P2, a second curve segment $C1'_B$ between the second and third points P2 and P3 and a third curve segment $C1'_C$ between the third and fourth points P3 and P4. Thereby, the first and second manipulable points P1 and P2 form a first and a second end point of the first curve segment $C1'_A$, the second and third manipulable points P2 and P3 form a first and a second end point of the second curve segment $C1'_B$ and the third and fourth manipulable points P3 and P4 form a first and a second end point of the third curve segment $C1'_C$.

The user can thus use system-generated points on the curve C1 as handles to edit its shape. The modification may be visually distinct for letting the user know that the shape is a hypothetical input and not a real trend based on control system data. The curve section editing module 48 may need to be activated by the user in order to be able to perform curve editing. However, curve editing may also be made available by default.

The curve section editing module 48 thus awaits input from the user, which input may comprise manipulating one or more of the manipulable points P1, P2, P3 and P4 of the curve. The physical quantity value of the manipulable point may be manipulable. The user may thus increase or decrease a value of the physical quantity Q. Also, the time value of the manipulable point may be manipulable. The user may thus also or instead adjust the time of the value forwards or backwards in time.

It is additionally possible that the user may add a point to or delete a point from the curve section. The curve section editing module may thus receive a new point from the user in the section of the first curve and/or a user deletion of a manipulable point from the curve section. A manipulable point may thus be deleted and/or a point may be added to the curve section.

The change of at least one manipulable point may lead to a change of at least one curve segment. The moving of a point may then lead to the curve segments it is used to define being changed, which may be a change of the slope of the curve segment. A deletion of a point may for instance lead to a removal of curve segments that the point is used to define or the replacement of these curve segments with a new curve segment.

The curve section editing module 48 thus receives the user changes of the curve section, S130. The curve section editing module 48 thereby receives a change of at least one of the manipulable points P1, P2 or P3 from the user. Thereby the section of the first curve is changed. The user changes thus lead to the creation of a changed curve section C1'.

The user may select to apply the curve section as input in an operation in the process control system, for instance through pressing a dedicated button such as a button "Apply". This may trigger the curve section application module 50 to apply the changed curve section C1' as an input to the operation in the process control system, S140.

FIGS. 7-10 show different ways in which a curve section may be changed according to the above-described principle.

Figure 7:
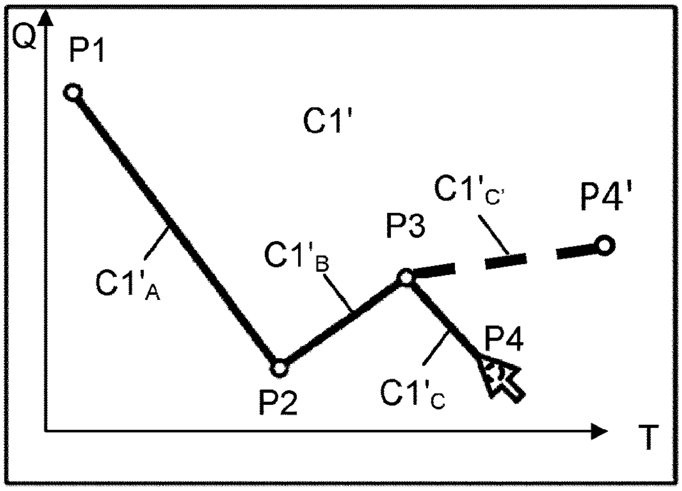
FIG. 7 shows a first change of the third curve segment made by the user.

It is for instance possible that the user changes the fourth point in both the amount of the quantity as well as its point in time. This could also mean that the third curve segment $C1'_C$ is changed into a first new third curve segment $C1'_{C'}$ with a new fourth point P4' as shown in FIG. 7, which change may be made through the user using an e-pen to draw the first new third curve segment $C1'_{C'}$ with the new fourth point P4' on the display 37 of the first user terminal 12. As can be seen, the slope as well as the length of the third curve segment $C1'_C$ may thereby be changed.

Figure 8:
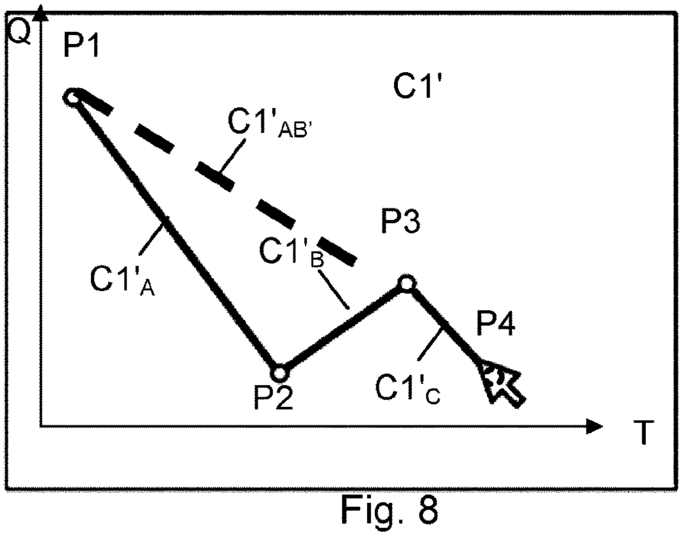
FIG. 8 shows how the first and second curve segments of the first curve have been replaced with a single new curve segment by the user.

It is as another example possible that the user deletes the second point P2, which may lead to the first and second curve segments $C1'_A$ and $C1'_B$ being replaced with a single new curve segment $C1'_{AB'}$ as shown in FIG. 8. Also, this change may be made through the user using an e-pen to draw the single new curve segment $C1'_{CAB'}$. In this case the second point P2 is ignored, which can be used in order to see what could have happened in past if an event did not occur, which event is associated with the value of the physical quantity Q of the second point P2.

Figure 9:
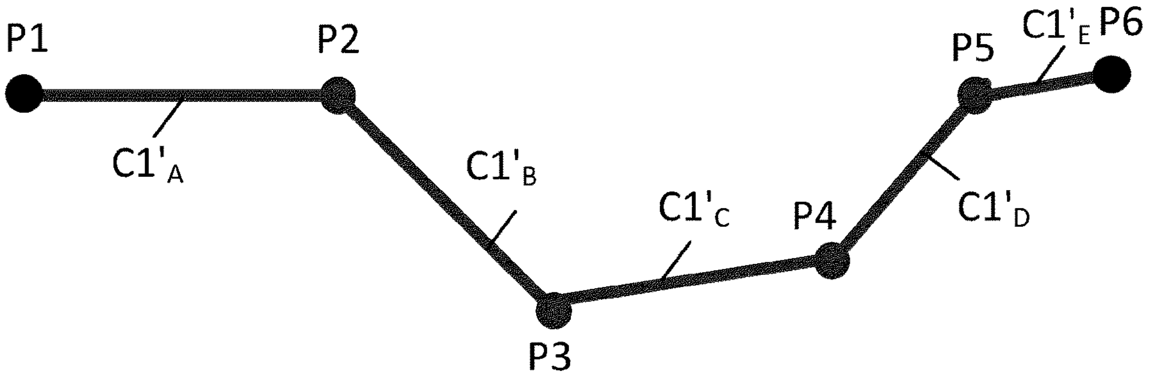
FIG. 9 shows a curve section of a further curve with a first, second, third, fourth and fifth curve segment and a first, second, third, fourth, fifth and sixth manipulable point, which can all be varied by the user.
Figure 10:
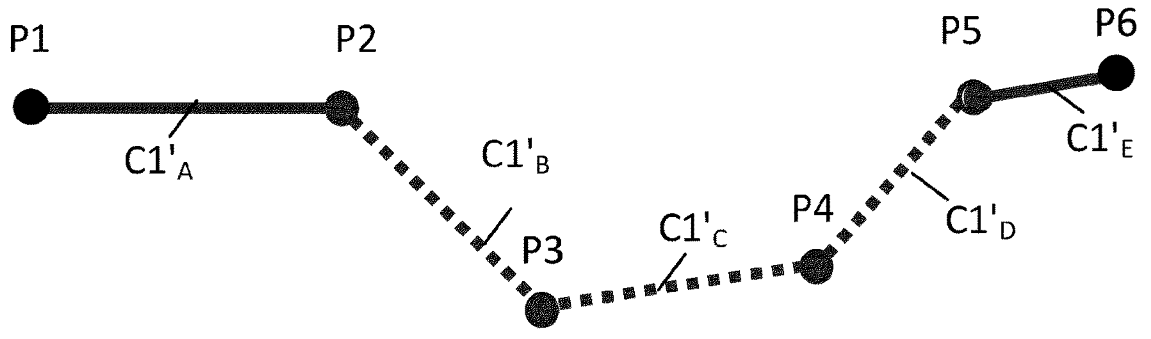
FIG. 10 shows how the user has selected the first and fifth curve segments to be applied as an input to an operation in the process control system, while the second third and fourth curve segments have been omitted from being applied.

In FIGS. 9 and 10 another example is given in relation to a further curve section of a further curve, which further curve section comprises a first, second, third, fourth and fifth curve segment $C1'_A$, $C1'_B$, $C1'_C$, $C1'_D$ and $C1'_E$ defined through a first, second, third, fourth, fifth and sixth manipulable point P1, P2, P3, P4, P5 and P6. The first and second manipulable points P1 and P2 form a first and a second end point of the first curve segment $C1'_A$, the second and third manipulable points P2 and P3 form a first and a second end point of the second curve segment $C1'_B$, the third and fourth manipulable points P3 and P4 form a first and a second end point of the third curve segment $C1'_C$, the fourth and fifth manipulable points P4 and P5 form a first and a second end point of the fourth curve segment $C1'_D$ and the fifth and sixth manipulable points P5 and P6 form a first and a second end point of the fifth curve segment $C1'_E$.

FIG. 10 shows how the user has selected the first, and fifth curve segments $C1'_A$ and $C1'_E$ to be applied as an input to an operation in the process control system, while the second, third and fourth curve segments $C1'_B$, $C1'_C$, $C1'_D$ have been omitted from being applied. If there is a first event taking place in the process at the second point P2, a second event taking place at the third point P3, a third event at the fourth point P4 and a fourth event at the fifth point P5, then this selection may be made if the user wants to investigate what leads to the fourth event at the fifth point P5 from the first event at the second point P2. Thereby the second and third events at the third and fourth points P3 and P4 are ignored as are the second, third and fourth curve sections $C1'_B$, $C1'_C$, $C1'_D$.

One way of applying the changed curve section C1' is to search for the curve section in a database of the process control system comprising values of the detected physical quantity Q. The applying may thus comprise using the curve section for searching in the database 18 using a search engine of the curve section application module 50.

The user can use the changed section of the curve as a search query. The search may then be a search for a sequence of values of the physical quantity separated by time steps corresponding to the time steps used in the area. It is then possible to search for the curve section of the physical quantity of the process control equipment from which the curve was obtained. The searching may thereby be made for the curve section in data of the same or a similar quantity of the same piece of equipment in the process control system from which the first curve was obtained. Alternatively, the search may be made for the same or a related physical quantity of another process control equipment in the process control system, such as equipment of the same or a similar type. The search may thus be made for the changed curve section in data of the same or a similar quantity for another piece of equipment in the process control system. The search may also be a search in equipment upstream or downstream of the equipment from which the curve was taken.

The search may for instance involve identifying similar events from the historical data based on a distance function (e.g., z-normalization based Euclidean distance). A distance based profile may then be created for each set of the investigated historical data.

It is thereafter possible to display the results to the user, for instance in an order of relevance. If a distance function is used, the found curves may for instance be ranked according to their distance from the changed curve section C1'.

It is thus possible to use the curve section as an input to the search. Since the user may create his or her own shape, the location of a desired shape can be made faster than if the user would have to locate the shape in the database. Moreover, since the desired shape can be formed from an existing shape, the effort required by the user to reach the desired shape can be kept low.

It is additionally possible that different variations of the curve section are used in respect of the different physical quantities and/or pieces of equipment.

Figure 11:
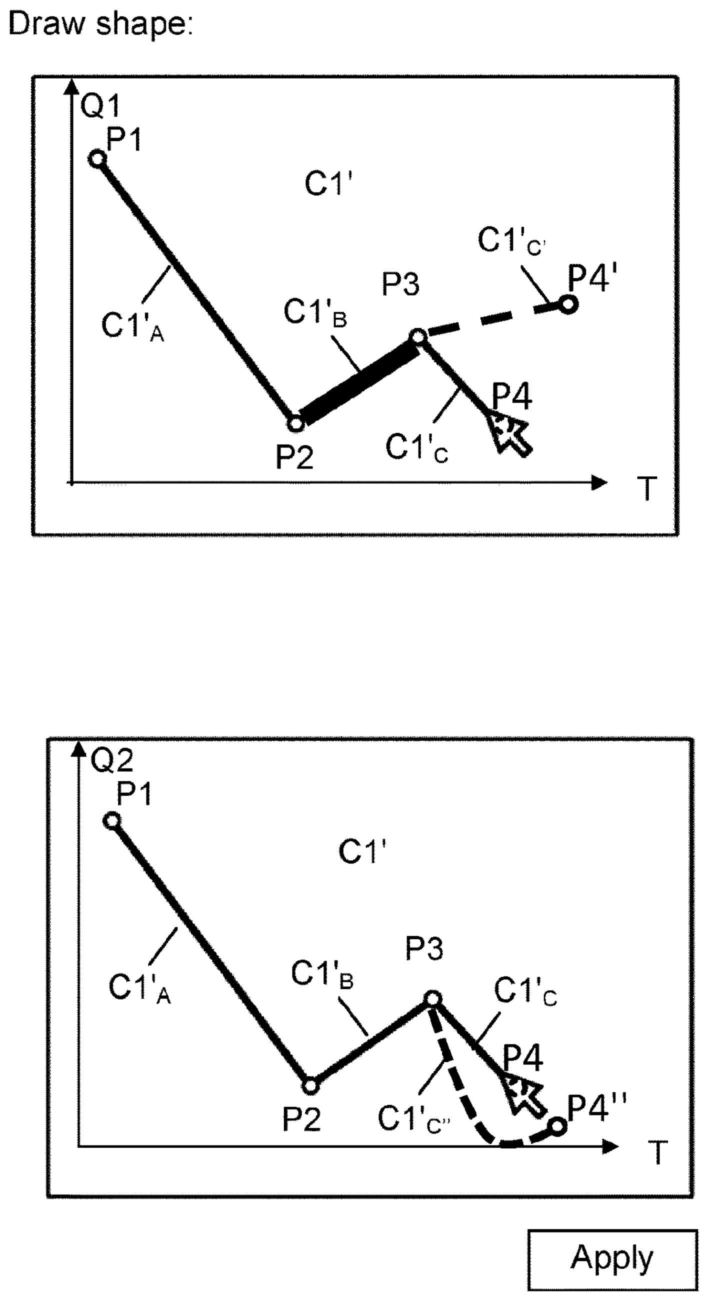
FIG. 11 shows the first change of the third curve segment of the curve section of the first curve made by the user for use as an input to an operation in the process control system with regard to a first physical quantity and a second change of the third curve segment of the curve section of the first curve for use as an input to an operation in the process control system with regard to a second physical quantity that is related to the first.

FIG. 11 shows one such example, where the third segment has been changed into the first new third segment $C1'_{C'}$ using a first changed fourth point P4' for a first quantity Q1 and into a second new third segment $C1'_{C''}$ using a second changed fourth point P4" for a second quantity Q2, where if in the example given earlier the first quantity Q1 is temperature then the second quantity Q2 may as an example be pressure.

It is in this case also possible that a part of the curve section is given higher weight in the search. The curve section editing module 48 may thereby receive a selection of a weight of a curve segment of the curve section and the searching for the curve section may then also involve a searching where the selected weight is applied for the curve segment. As an example, the second curve segment $C1'_B$ is given such a higher weight in the search, which is indicated through the segment being thicker than the other segments.

One or both such curve sections may additionally be saved as a scenario and later used in simulations, for instance for training of a model of the process control system, say as in an event (anomaly) classifier. It is also possible that annotations are being added to such a scenario.

It is additionally possible that the search engine of the curve section application module 50 performs searches in different groups of curves or curve sections. The search may comprise a search in a database with historic curves of physical quantities of the process control system. Alternatively or additionally the search may comprise a search in a database of searches made by other users. A first group of curves being searched may be a group of historic curves in a database with historic curves, while a second group of curve sections being searched may be a group in a database of searches made by other users. The results may then be provided according to the different groups. A first group may then comprise a number of ranked results according to a data science context, i.e. in the context of the similarity to the existing curves, while a second group may comprise similarities to searches made by other users.

It is additionally possible that the user is presented with a suggestion of other physical properties and/or pieces of equipment to search.

The search engine of the curve section application module 50 may for instance perform a correlation of the user entered curve section to curve sections of other physical quantities and/or other pieces of equipment in the process control system and identify one or more curve sections of one or more other physical quantities and/or other pieces of equipment and suggest to the user to search among these other physical quantities and/or other pieces of equipment.

Figure 12:
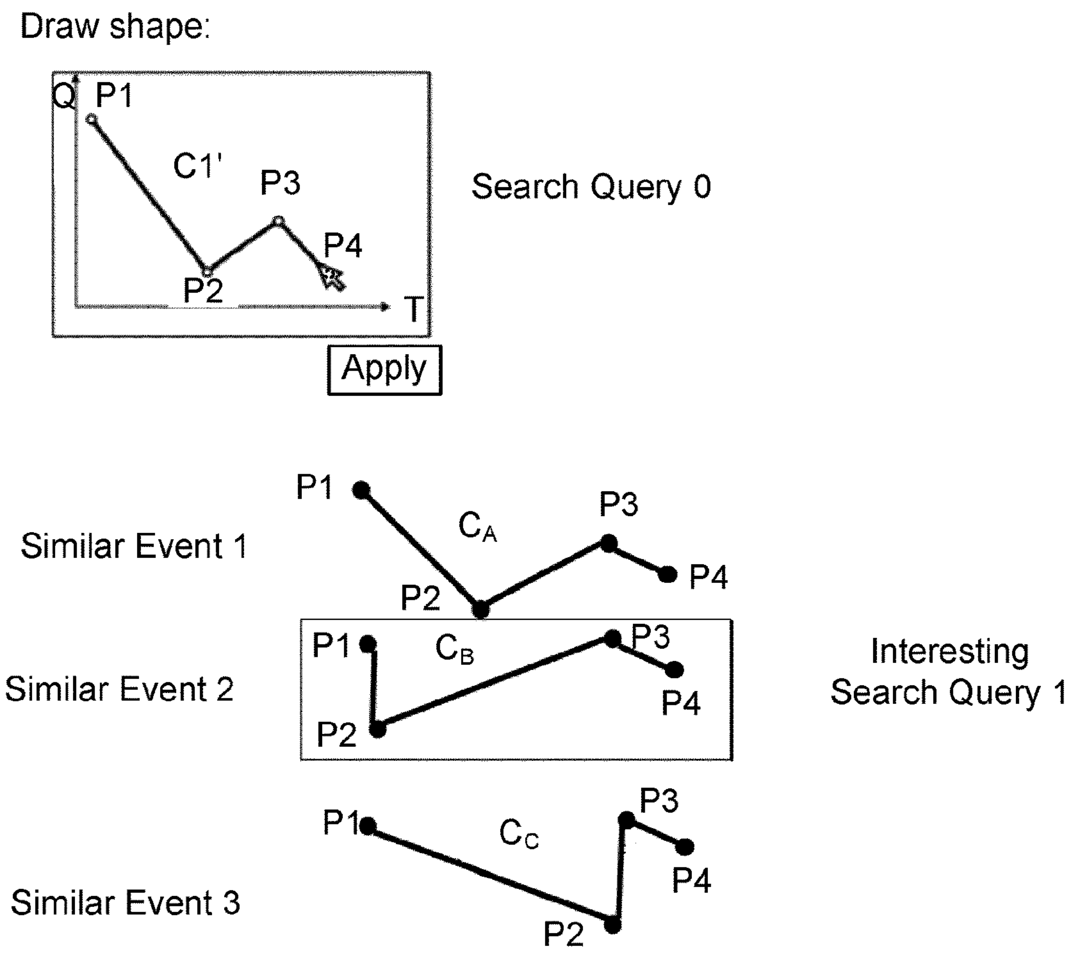
FIG. 12 shows the use of the curve section of the first curve with the first, second and third curve segments used for searching together with exemplifying results of the search and the selection by the user of one of the search results for further use.

It is also possible to perform further searches based on one of the search results. As can be seen in FIG. 12, a search made on the curve section shown in FIG. 6 may provide results in a list of similar curve sections, where a first curve section CA represents a first similar event, a second curve section CB represents a second similar event and a third curve section Cc represents a third similar event. The user may then select one of these curve sections for further searches. As an example, the user has here selected the second curve section CB corresponding to the second similar event.

As was mentioned earlier, it is also possible to use the curve section as an input in other types of operations than search. It is for instance possible to use it in as an input to a simulation. The curve section of the physical quantity Q can thus be used in a simulation of the industrial process. The curve shape C1' can for instance be introduced as a curve shape of the physical quantity of the piece of process control equipment in question or of another process control equipment of the same or similar type in order to investigate how the process control system would react if the physical quantity of the process control equipment had the appearance of the curve section. The curve can thus be used in simulation, such as in the previously described anomaly classifier. The software for the simulation could as an example be stored in the user terminal memory 40 and performed under control of the user terminal processor 34. However also other locations are possible. It is for instance possible to have a simulation server connected between the first and the second bus B1 and B2.

It can thus be seen that the curve shape can be used in a number of different operations.

It is additionally possible to perform a joint operation for two curves, where one or both may be changed according to the previously described principles. This can be done using a so-called lasso feature implemented by the curve section selection module 46.

The lasso feature, which is optional, is used to identify relationships between two or more trends. The operator can use a lasso tool provided by the curve section selection module 46 to loop through and connect two curves. Then the operator can use the combination of the two curves in the desired operation. In relation to search, the user can choose if he or she wants to see the correlation or search for times when the two curves occur together ('AND' option). Naturally one or both of the curve sections can also be changed according to the above-described principles.

Figure 13:
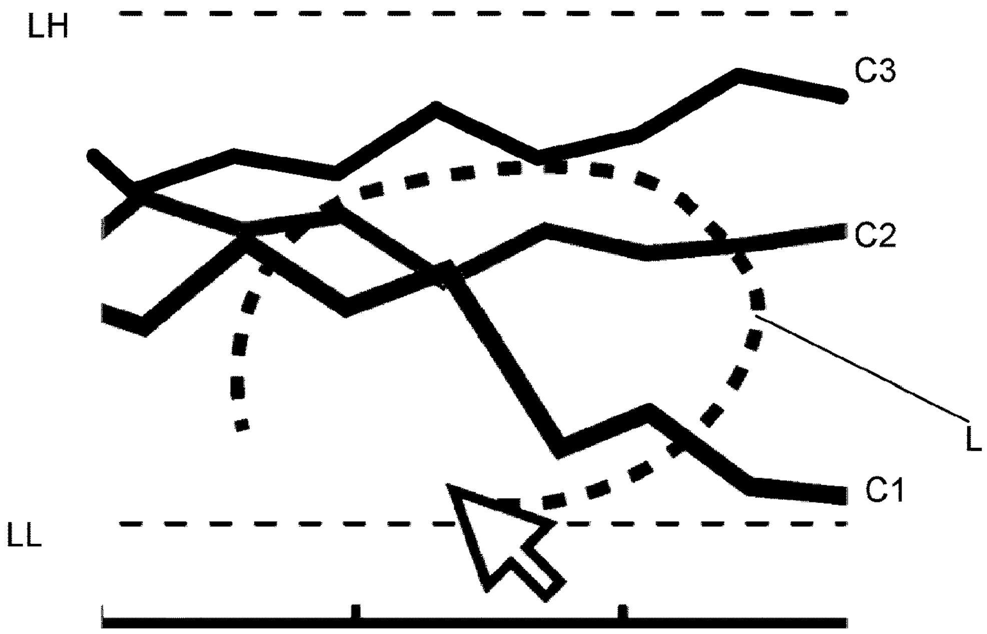
FIG. 13 shows two curves that have been combined with a lasso tool for performing an operation.

In practice the lasso tool can function as a snip, but instead of a polygonal boundary, it has a flexible boundary that helps connect different parts of the same curve or even two different curves together. The activation of lasso is a natural extension of the snip. A selection of a section of a curve from the user is in this case received as part of a selection of two sections made by the user via the curve section selection module 46, where each section is a section of a corresponding curve. Lassoing using a lasso L is exemplified in FIG. 13 for the first and the second curve C1 and C2. Possible implementations include a dedicated key press in combination with click and drag, an icon activation or multi touch input.

The curve section application module 50 then applies the two curve sections of the two curves C1 and C2 selected by the curve section selection module 46 in the process control system, possibly after one or both have been changed.

A collection of interactions has been presented that increase the effectiveness of operations such as search for operators, process engineers and other relevant stakeholders in process industries. It involved a number of interactions: Snip, highlighting of components that can be snipped, selection refinement, curve shape refinement and lasso based multivariate search.

The aspects presented herein aim to protect the interaction metaphors irrespective of the software platform or implementation. The interaction could be implemented on a screen-based device such as a monitor keyboard combination, touch devices such as tablets, panels or even mobile phones. There are thus several ways in which the user terminal may be realized.

As was mentioned earlier, the user terminal may be provided in the form of a processor with associated program memory including computer program code for implementing the curve operations function.

Figure 14:
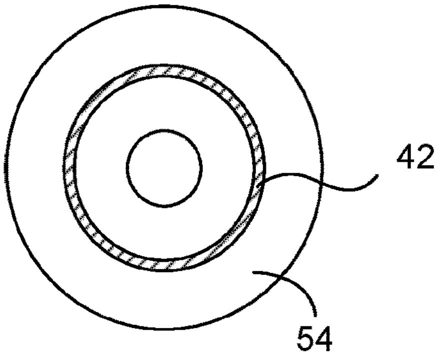
FIG. 14 shows a computer program product in the form of a CD ROM disc with a computer program performing the curve operations function.

A computer program may also be a computer program product, for instance in the form of a computer readable storage medium or data carrier, like a CD ROM disc or a memory stick, carrying such a computer program with the computer program code, which will implement the above-described curve operations function when being loaded into a processor. One such computer program product in the form of a CD ROM disc 54 with the above-mentioned computer program code 42 is schematically shown in FIG. 14.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore, the invention is only to be limited by the following claims.

The invention claimed is:

1. A user terminal for a process control system, the user terminal comprising a processor configured to:

obtain a first curve of a detected physical quantity of a piece of process control equipment in the process control system, said first curve having points with values of the physical quantity at various time instances, provide at least one of the points in a section of the first curve as a manipulable point that a user can change, receive a selection from the user of the section of the first curve for enabling changing of the section of the first curve, wherein the selection of the section of the first curve is received in a selection of two sections, each being a section of a corresponding curve, receive from the user a change of at least one of the manipulable points in said section, thereby changing the section of the first curve, and apply the changed section of the first curve as an input to an operation in the process control system, wherein when applying the section of the first curve the processor is configured to apply the two curve sections of the two curves in the process control system.

2. The user terminal according to claim 1, wherein the physical quantity value of the manipulable point is manipulable.

3. The user terminal according to claim 2, wherein the time instance of the manipulable point is manipulable.

4. The user terminal according to claim 2, the processor being further configured to receive a new point in the section of the curve from the user and/or a user deletion of a manipulable point from the section of the curve.

5. The user terminal according to claim 2, wherein the manipulable points define end points of curve segments, and the received change of at least one manipulable point leads to a change of at least one curve segment.

6. The user terminal according to claim 1, wherein the time instance of the manipulable point is manipulable.

7. The user terminal according to claim 1, the processor being further configured to receive a new point in the section of the curve from the user and/or a user deletion of a manipulable point from the section of the curve.

8. The user terminal according to claim 1, wherein the manipulable points define end points of curve segments, and the received change of at least one manipulable point leads to a change of at least one curve segment.

9. The user terminal according to claim 1, wherein the application comprises searching for the curve section in a database of the process control system including values of the physical quantity.

10. The user terminal according to claim 9, wherein manipulable points define end points of curve segments, and the received change of at least one manipulable point leads to a change of at least one curve segment and the processor is configured to receive a selection of a weight of a curve segment of the section of the first curve, where the searching for the curve section involves a searching with the selected weight being applied for said curve segment.

11. The user terminal according to claim 9, wherein the searching is made for the curve section in data of the same or a similar quantity of the same piece of equipment in the process control system.

12. The user terminal according to claim 9, wherein the searching is made for the changed curve section in data of the same or a similar quantity for another piece of equipment in the process control system.

13. The user terminal according to claim 1, wherein the applying comprises applying the curve section as a curve section of the physical quantity in a simulation of the process.

14. The user terminal according to claim 1, wherein the applying comprises using the changed curve section in the training of a model used in the process control system.

15. A process control system comprising a user terminal having a processor configured to:

obtain a first curve of a detected physical quantity of a piece of process control equipment in the process control system, said first curve having points with values of the physical quantity at various time instances, provide at least one of the points in a section of the first curve as a manipulable point that a user can change, receive a selection from the user of the section of the first curve for enabling changing of the section of the first curve, wherein the selection of the section of the first curve is received in a selection of two sections, each being a section of a corresponding curve, receive from the user a change of at least one of the manipulable points in said section, thereby changing the section of the first curve, and apply the changed section of the first curve as an input to an operation in the process control system, wherein when applying the section of the first curve the processor is configured to apply the two curve sections of the two curves in the process control system.

16. A method for using a curve in a process control system, the method being performed in a user terminal and comprising:

obtaining a first curve of a detected physical quantity of a piece of process control equipment in the process control system, said first curve including points with values of the physical quantity at various time instances, providing at least one of the points in a section of the first curve as a manipulable point that a user can change, receiving a selection from the user of the section of the first curve for enabling changing of the section of the first curve, wherein the selection of the section of the first curve is received in a selection of two sections, each being a section of a corresponding curve, receiving from the user a change of at least one of the manipulable points in said section thereby changing the section of the first curve, and applying the changed section of the first curve as an input to an operation in the process control system, wherein when applying the section of the first curve the two curve sections of the two curves are applied in the process control system.

17. A non-transitory computer-readable medium storing a computer program for using a curve in a process control system, the computer program comprising computer program code which when run in a processor, causes a user terminal to:

obtain a first curve of a detected physical quantity of a piece of process control equipment in the process control system, said first curve including points with values of the physical quantity at various time instances, provide at least one of the points in a section of the first curve as a manipulable point that a user can change, receive a selection from the user of the section of the first curve for enabling changing of the section of the first curve, wherein the selection of the section of the first curve is received in a selection of two sections, each being a section of a corresponding curve, receive from the user a change of at least one of the manipulable points in said section thereby changing the section of the first curve, and apply the changed section of the first curve as an input to an operation in the process control system, wherein when applying the section of the first curve the computer program code causes the user terminal to apply the two curve sections of the two curves in the process control system.

18. A computer program product for using a curve in a process control system, the computer program product comprising a non-transitory data carrier with the computer program code, which when run in a processor, causes a user terminal to:

obtain a first curve of a detected physical quantity of a piece of process control equipment in the process control system, said first curve including points with values of the physical quantity at various time instances, provide at least one of the points in a section of the first curve as a manipulable point that a user can change, receive a selection from the user of the section of the first curve for enabling changing of the section of the first curve, wherein the selection of the section of the first curve is received in a selection of two sections, each being a section of a corresponding curve, receive from the user a change of at least one of the manipulable points in said section thereby changing the section of the first curve, and apply the changed section of the first curve as an input to an operation in the process control system, wherein when applying the section of the first curve the computer program code causes the user terminal to apply the two curve sections of the two curves in the process control system.

* * * * *